(12) United States Patent
Kano

(10) Patent No.: US 11,087,622 B2
(45) Date of Patent: Aug. 10, 2021

(54) ATTENTION CALLING APPARATUS FOR VEHICLE, METHOD OF CALLING ATTENTION TO DRIVING OF VEHICLE, AND COMPUTER-READABLE RECORDING MEDIUM CONTAINING PROGRAM

(71) Applicant: SUBARU CORPORATION, Tokyo (JP)

(72) Inventor: Tatsuo Kano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/741,978

(22) Filed: Jan. 14, 2020

(65) Prior Publication Data
US 2020/0302786 A1 Sep. 24, 2020

(30) Foreign Application Priority Data
Mar. 18, 2019 (JP) .............................. JP2019-049529

(51) Int. Cl.
*G08G 1/0962* (2006.01)
*G10L 15/22* (2006.01)
*G10L 13/00* (2006.01)
*G10L 15/26* (2006.01)

(52) U.S. Cl.
CPC .......... *G08G 1/09626* (2013.01); *G10L 13/00* (2013.01); *G10L 15/22* (2013.01); *G10L 15/26* (2013.01); *G10L 2015/223* (2013.01)

(58) Field of Classification Search
CPC combination set(s) only.
See application file for complete search history.

(56) References Cited

U.S. PATENT DOCUMENTS

| 6,956,470 B1* | 10/2005 | Heise ..................... B60K 35/00 340/438 |
| 2005/0182632 A1* | 8/2005 | Niyamaru .......... G09B 19/0038 704/275 |
| 2015/0006167 A1 | 1/2015 | Kato et al. |
| 2019/0120649 A1* | 4/2019 | Seok .................. G01C 21/3629 |
| 2019/0189002 A1* | 6/2019 | Suzuki .................. B60W 40/09 |

FOREIGN PATENT DOCUMENTS

| JP | 2003-323191 A | 11/2003 |
| JP | 5512597 B2 | 6/2017 |
| WO | 2014/0002128 A1 | 1/2014 |

\* cited by examiner

*Primary Examiner* — Thomas S McCormack
(74) *Attorney, Agent, or Firm* — Troutman Pepper Hamilton Sanders LLP

(57) ABSTRACT

An attention calling apparatus for a vehicle includes a voice receiver, an utterance estimating unit, a precaution information determining unit, and a notification unit. The voice receiver receives a voice from occupants in the vehicle. The utterance estimating unit estimates an utterance on the basis of the voice. The precaution information determining unit determines whether the utterance includes precaution information regarding driving of the vehicle. The notification unit notifies at least one of the occupants of the precaution information when the utterance includes the precaution information.

14 Claims, 3 Drawing Sheets

ATTENTION CALLING APPARATUS FOR VEHICLE, METHOD OF CALLING ATTENTION TO DRIVING OF VEHICLE, AND COMPUTER-READABLE RECORDING MEDIUM CONTAINING PROGRAM

CROSS-REFERENCE TO RELATED APPLICATIONS

The present application claims priority from Japanese Patent Application No. 2019-049529 filed on Mar. 18, 2019, the entire contents of which are hereby incorporated by reference.

BACKGROUND

The disclosure relates to an attention calling apparatus for a vehicle, a method of calling attention to driving of the vehicle, and a computer-readable recording medium containing a program.

An on-board information device is known that is to be mounted on a vehicle and configured to provide information for assisting an occupant in the vehicle. For example, International Publication No. 2014/002128 discloses an on-board information device that includes a voice acquisition section that detects and acquires an utterance of an occupant, a voice recognition section that recognizes the content of the utterance, an output control section that generates and controls display data or voice data indicative of the content of the utterance recognized by the voice recognition section, and an output section that outputs the display data or the voice data generated by the output control section.

SUMMARY

An aspect of the technology provides an attention calling apparatus for a vehicle. The attention calling apparatus includes a voice receiver, an utterance estimating unit, a precaution information determining unit, and a notification unit. The voice receiver is configured to receive a voice from occupants in the vehicle. The utterance estimating unit is configured to estimate an utterance on the basis of the voice. The precaution information determining unit is configured to determine whether the utterance includes precaution information regarding driving of the vehicle. The notification unit is configured to notify at least one of the occupants of the precaution information when the utterance includes the precaution information.

An aspect of the technology provides a method of calling attention to driving of a vehicle. The method includes: receiving a voice from occupants in the vehicle; estimating an utterance on the basis of the voice; determining whether the utterance includes precaution information regarding the driving of the vehicle; and notifying at least one of the occupants of the precaution information when the utterance includes the precaution information.

An aspect of the technology provides a non-transitory computer-readable recording medium containing a program. The program causes, when executed by a computer, the computer to implement a method which includes: receiving a voice from occupants in a vehicle; estimating an utterance on the basis of the voice; determining whether the utterance includes precaution information regarding driving of the vehicle; and notifying at least one of the occupants of the precaution information when the utterance includes the precaution information.

An aspect of the technology provides an attention calling apparatus for a vehicle. The apparatus includes a voice receiver configured to receive a voice from occupants in the vehicle, and circuitry configured to estimate an utterance on the basis of the voice, determine whether the utterance includes precaution information regarding driving of the vehicle, and notify at least one of the occupants of the precaution information when the utterance includes the precaution information.

BRIEF DESCRIPTION OF THE DRAWINGS

The accompanying drawings are included to provide a further understanding of the technology and are incorporated in and constitute a part of this specification. The drawings illustrate exemplary embodiments and, together with the specification, serve to explain the principles of the technology.

DETAILED DESCRIPTION

A conversation exchanged between occupants during driving of a vehicle sometimes includes precaution information regarding the driving of the vehicle. In such a situation, providing the precaution information regarding the driving to a driver of the vehicle prompts the driver to pay attention to the driving, which enhances user convenience. The on-board information device disclosed in International Publication No. 2014/002128 described above recognizes the content of an utterance of an occupant and outputs display data or voice data indicative of the content of the utterance. However, the on-board information device fails to offer any measures to cope with an utterance including precaution information regarding driving.

It is desirable to provide an apparatus, a method, and a computer-readable recording medium containing a program that call driver's attention to precaution information that is relevant to driving of a vehicle and included in a conversation between occupants in the vehicle.

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
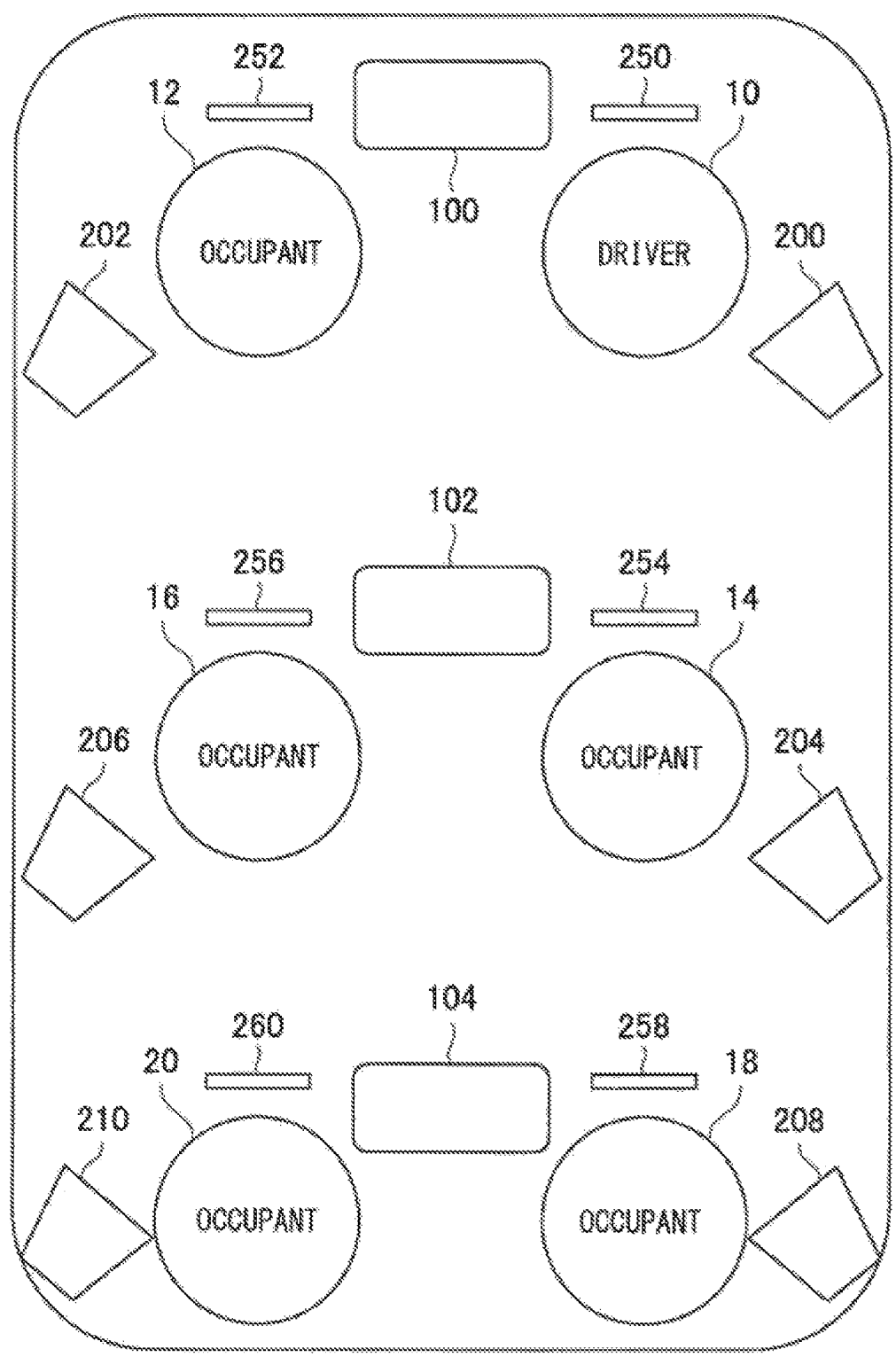
FIG. 1 is a schematic plan view of an exemplary configuration of a vehicle according to one example embodiment of the technology.

FIG. 1 is a schematic plan view of an exemplary configuration of a vehicle 1000 according to an embodiment of the technology. As illustrated in FIG. 1, there may be six occupants 10, 12, 14, 16, 18, and 20 in the vehicle 1000. The occupant 10 may be a driver.

Speakers 200, 202, 204, 206, 208, and 210 may be disposed in the vehicle 1000. The speaker 200 may generate a sound toward the occupant 10 or the driver. Likewise, the speaker 202, 204, 206, 208, and 210 may be assigned to the respective occupants 12, 14, 16, 18, and 20, and output a sound toward the respective occupants 12, 14, 16, 18, and 20.

Displays 250, 252, 254, 256, 258, and 260 may be disposed in the vehicle 1000. The display 250 may display an image to the occupant 10 or the driver. Likewise, the displays 252, 254, 256, 258, and 260 may be assigned to the respective occupants 12, 14, 16, 18, and 20, and display an image to the respective occupants 12, 14, 16, 18, and 20.

Three microphones 100, 102, and 104 may be disposed in the vehicle 1000. The microphone 100 may collect voices of the occupants 10 and 12 on a front seat. The microphone 102 may collect voices of the occupants 14 and 16 on a middle seat. The microphone 104 may collect voices the occupants 18 and 20 on a back seat.

A conversation between the occupants in the vehicle 1000 can be hindered by music played in the vehicle 1000, an external sound entering the vehicle through an opened window, and other sounds than sounds of a conversation.

In this embodiment, the microphones 100, 102, and 104 may collect voices of the occupants 10, 12, 14, 16, 18, and 20, and output the voices from the respective speakers 200, 202, 204, 206, 208, and 210. For example, voices collected by the microphones 100, 102, and 104 may be once converted into text data (character data), and then the text data may be converted into speech. The speech may be outputted from the speakers 200, 202, 204, 206, 208, and 210. Alternatively, voices collected by the microphones 100, 102, and 104 may be once converted into text data, and then the text data may be displayed on the displays 250, 252, 254, 256, 258, and 260. This facilitates a conversation between the occupants without hindrance. Still alternatively, the speech may be outputted from the speakers 200, 202, 204, 206, 208, and 210 without a conversion into text data.

A conversation between the occupants may sometimes include precaution information regarding driving of the vehicle. Examples of the precaution information included in a conversation may include an utterance, such as "A vehicle is coming from the right!", "We are approaching the tail end of the traffic jam.", "The distance from the preceding vehicle is short.", or "The road ahead of us is frozen.". In this embodiment, a determination is made as to whether a conversation includes precaution information. When precaution information is included, the utterance including the precaution information may be outputted with emphasis from the speaker 200, 202, 204, 206, 208, and 210. For instance, when a conversation includes precaution information, the utterance including the precaution information may be outputted with emphasis from the speaker 200 to the occupant 10 or the driver. This prompts the driver to pay attention to an event to which the precaution information is directed and appropriately cope with the event.

When the precaution information "A vehicle is coming from the right!" is included in a conversation, for example, the precaution information may be outputted from the speaker 200 to the occupant 10 or the driver. This prompts the driver to take an appropriate measure to avoid contact with the vehicle coming from the right. For instance, the driver may be prompted to turn the steering wheel to the left. When the precaution information "The road ahead of us is frozen." is outputted from the speaker 200 to the occupant 10 or the driver, the driver may be prompted to take an appropriate measure to avoid slipping of the vehicle 1000. For instance, the driver may be prompted to press the brake pedal to decelerate the speed of the vehicle in advance.

Figure 2:
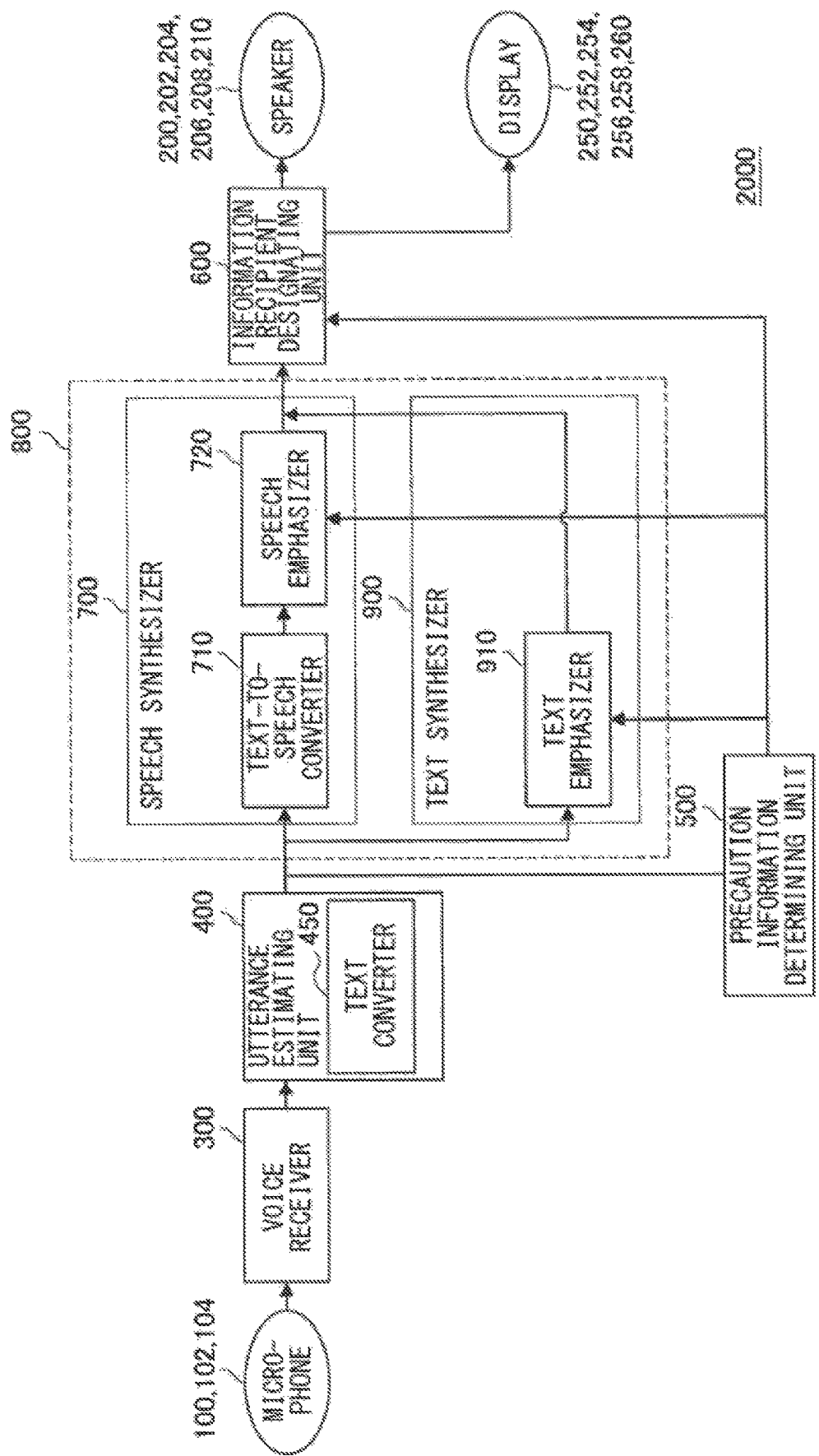
FIG. 2 is a schematic diagram of an exemplary configuration of an attention calling apparatus for a vehicle according to one example embodiment of the technology.

FIG. 2 is a schematic diagram of an exemplary configuration of an attention calling apparatus 2000 for a vehicle according to an embodiment of the technology. As illustrated in FIG. 2, the attention calling apparatus 2000 includes a voice receiver 300, an utterance estimating unit 400, a precaution information determining unit 500, an information recipient designating unit 600, and an output unit 800 in addition to the microphones 100, 102, and 104, the speakers 200, 202, 204, 206, 208, and 210, and the displays 250, 252, 254, 256, 258, 260. The output unit 800 may include a speech synthesizer 700 that includes a text-to-speech converter 710 and a speech emphasizer 720. In one embodiment, the text-to-speech converter 710 may serve as a "speech converter". The output unit 800 may further include a text synthesizer 900 that includes a text emphasizer 910. In one embodiment, the output unit 800 may serve as a "notification unit". For example, each of the components of the attention calling apparatus 2000 illustrated in FIG. 2 may be configured by hardware such as circuitry. Alternatively, each of the components in the attention calling apparatus 2000 may be configured by a central processing unit (CPU) and software such as a program to be executed by the CPU.

Voices of the occupants 10, 12, 14, 16, 18, and 20 collected by the microphones 100, 102, and 104 may be transmitted to the voice receiver 300. The voices transmitted to the voice receiver 300 may be sent to the utterance estimating unit 400. The utterance estimating unit 400 may perform speech recognition to estimate an utterance contained in a conversation between the occupants. Note that the utterance estimating unit 400 may estimate the content of the utterance as well as the utterance itself. In other words, the utterance estimating unit 400 may estimate a sentence and a word contained in the utterance. Examples of the word contained in the utterance of an occupant may include "Man!" and "Stone!".

For example, a process executed by the utterance estimating unit 400 may be divided into two major categories including acoustic analysis and speech recognition. The acoustic analysis may involve voice encoding, noise processing, and a correction, for example. The speech recognition may involve acoustic processing and language processing of the voice data encoded through the acoustic analysis, to extract the highest possible word or character string. To this end, the utterance estimating unit 400 may include a text converter 450 that converts voice data into text data. In one embodiment, the text converter 450 may serve as a "text converter". The acoustic analysis and the speech recognition may be performed on the basis of an acoustic model and a language model. A dictionary may be prepared in which acoustic patterns, words, and character strings used in each of the models are registered. Developing the dictionary may enhance the efficiency of the speech recognition. Note that the utterance estimating unit 400 may estimate an utterance using, for example, the above-described technique disclosed in International Publication No. 2014/002128 or the technique disclosed in Japanese Unexamined Patent Application Publication No. 2003-323191 as appropriate.

When the utterance estimating unit 400 recognizes voice data and converts the voice data into text data, the text data may be transmitted to the speech synthesizer 700 and the text synthesizer 900 of the output unit 800. The text data may also be transmitted to the precaution information determining unit 500. The precaution information determining unit 500 may determine whether the text data includes precaution information. For example, the precaution information determining unit 500 may determine whether the text data includes precaution information through keyword detection. Examples of the keyword may include "traffic jam", "rain", "snow", "following vehicle", "next lane", "road surface", and "gasoline". The precaution information determining unit 500 may include a database that holds these keywords. When text data contains any of the keywords, the precaution information determining unit 500 may determine that the text data includes precaution information. The text data that includes precaution information may be transmitted to the speech emphasizer 720 of the speech synthesizer 700 and the text emphasizer 910 of the text synthesizer 900.

When the text data contains precaution information, the output unit 800 may output notification information to notify the occupant(s) of the precaution information. To this end, the speech synthesizer 700 in the output unit 800 may include the speech emphasizer 720, and the text synthesizer 900 in the output unit 800 may include the text emphasizer 910. Alternatively, the output unit 800 may output a sound or light to call attention of the occupant(s). Optionally, the output unit 800 may output or transmit the notification information to an external device outside the vehicle compartment as well as an in-vehicle device disposed in the vehicle compartment.

When the speech synthesizer 700 receives the text data estimated by the utterance estimating unit 400, the text-to-speech converter 710 may convert the text data into speech. For example, the text-to-speech converter 710 may synthesize speech from a character string. Such speech synthesis from a character string may be based on the method disclosed in Japanese Patent No. 5512597 or another appropriate method. To achieve the speech synthesis, two databases may be prepared: One of the databases may include character strings and words each of which is correlated with a set of phonemic symbols, and the other of the databases may include phonemic symbols each of which is correlated with a waveform. On the basis of these databases, the text data may be converted into a series of phonemic symbols which may then be converted into a waveform. Optionally, the text-to-speech converter 710 may perform translation or summarizing, for example.

When the text data includes precaution information, the speech emphasizer 720 may change the sound volume of the speech obtained through the conversion at the text-to-speech converter 710. For example, the speech emphasizer 720 may increase the sound volume of the speech obtained through the conversion at the text-to-speech converter 710 when the text data includes precaution information. Alternatively, the speech emphasizer 720 may emphasize the speech in any other way than by increasing the sound volume. For example, the speech emphasizer 720 may emphasize the speech by changing the sound quality of the speech, repeating the notification of the precaution information several times, or changing the speed of the speech, for example. The speed of the speech may be changed by changing the frequency of a voltage to be varied in accordance with a single sound signal, for example. The speech emphasizer 720 may increase the sound volume by changing a uniform coefficient to be applied to the voltages of the speakers 200, 202, 204, 206, 208, and 210. After being changed in the sound volume at the speech emphasizer 720, the speech may be outputted from the speakers 200, 202, 204, 206, 208, and 210. In this embodiment, the speech synthesizer 700 may output a conversation between occupants via the speaker(s) after emphasizing the speech synthesized from the conversation. In an alternative embodiment, the speech synthesizer 700 may output a warning sound or a voice indicative of a fixed phrase to call attention of the occupant(s).

When the text synthesizer 900 receives the estimated text data including precaution information from the utterance estimating unit 400, the text emphasizer 910 may perform a process of emphasizing the precaution information. For example, the text emphasizer 910 may emphasize the precaution information by making a character string corresponding to the precaution information bold, changing the color of the character string, changing the font size of the character string to larger, or blinking the character string. The content of the utterance that includes the precaution information emphasized by the text emphasizer 910 may be displayed on the displays 250, 252, 254, 256, 258, and 260.

The information recipient designating unit 600 may determine an occupant to be notified of information (hereinafter referred to as an "information recipient"). When the text data includes precaution information, the information recipient designating unit 600 may designate the occupant 10 or the driver as an information recipient. In contrast, when the text data contains no precaution information, the information recipient designating unit 600 may designate all of the occupants 10, 12, 14, 16, 18, and 20 as information recipients. In this way, at least one speaker from which information is to be outputted may be determined so that only the information recipient(s) designated by the information recipient designating unit 600 is notified of speech information. Alternatively, two or more of the occupants (e.g., the occupant 10 or the driver and the occupant 12) may be determined as the information recipients when the text data includes precaution information.

The determination as to whether precaution information is included may be based on voice data before being converted into text data, and the processes for emphasizing speech and texts described above may be performed on the basis of the results of the determination. The determination as to whether precaution information is included in the voice data may be made on the basis of the comparison between the results of time-frequency analysis of the voice data and the frequency characteristics of a keyword of the precaution information.

An exemplary process executed by the attention calling apparatus 2000 according to an embodiment of the technology will now be described with reference to a flowchart illustrated in FIG. 3. In the following description with reference to FIG. 3, a process executed by the speech synthesizer 700 is exemplified as a process executed by the output unit 800. Note that, a process executed by the text synthesizer 900 may be performed likewise. First, in Step S10, a determination may be made as to whether a voice is received at the voice receiver 300. When a voice is received at the voice receiver 300 (Step S10: YES), the process may proceed to Step S12. In Step S12, the utterance estimating unit 400 may estimate an utterance and generate text data of the utterance. In Step S14, the precaution information determining unit 500 may determine whether the text data of the utterance includes precaution information. When the text data of the utterance includes precaution information (Step S14: YES), the process may proceed to Step S16.

In Step S16, the information recipient designating unit 600 may designate only the driver (the occupant 10) as an information recipient. In Step S18, the text-to-speech converter 710 of the speech synthesizer 700 may convert the text data of the utterance into speech.

In Step S20, the speech emphasizer 720 may increase the sound volume of the speech obtained through the conversion at the text-to-speech converter 710. In Step S22, the speech may be outputted from the speaker 200 disposed adjacent to the occupant 10 or the driver. After Step S22, the process may end.

In contrast, when the text data of the utterance includes no precaution information (Step S14: NO), the process may proceed to Step S24. In Step S24, the information recipient designating unit 600 may designate all of the occupants 10, 12, 14, 16, 18, and 20 as information recipients. Thereafter, in Step S26, the text-to-speech converter 710 of the speech synthesizer 700 may convert the text data of the utterance into speech.

The process may proceed from Step S26 to Step S22. In this case, the utterance includes no precaution information. Thus, the speech emphasizer 720 may output the speech from all of the speakers 200, 202, 204, 206, 208, and 210 without changing the sound volume of the speech. After Step S22, the process may end.

Figure 3:
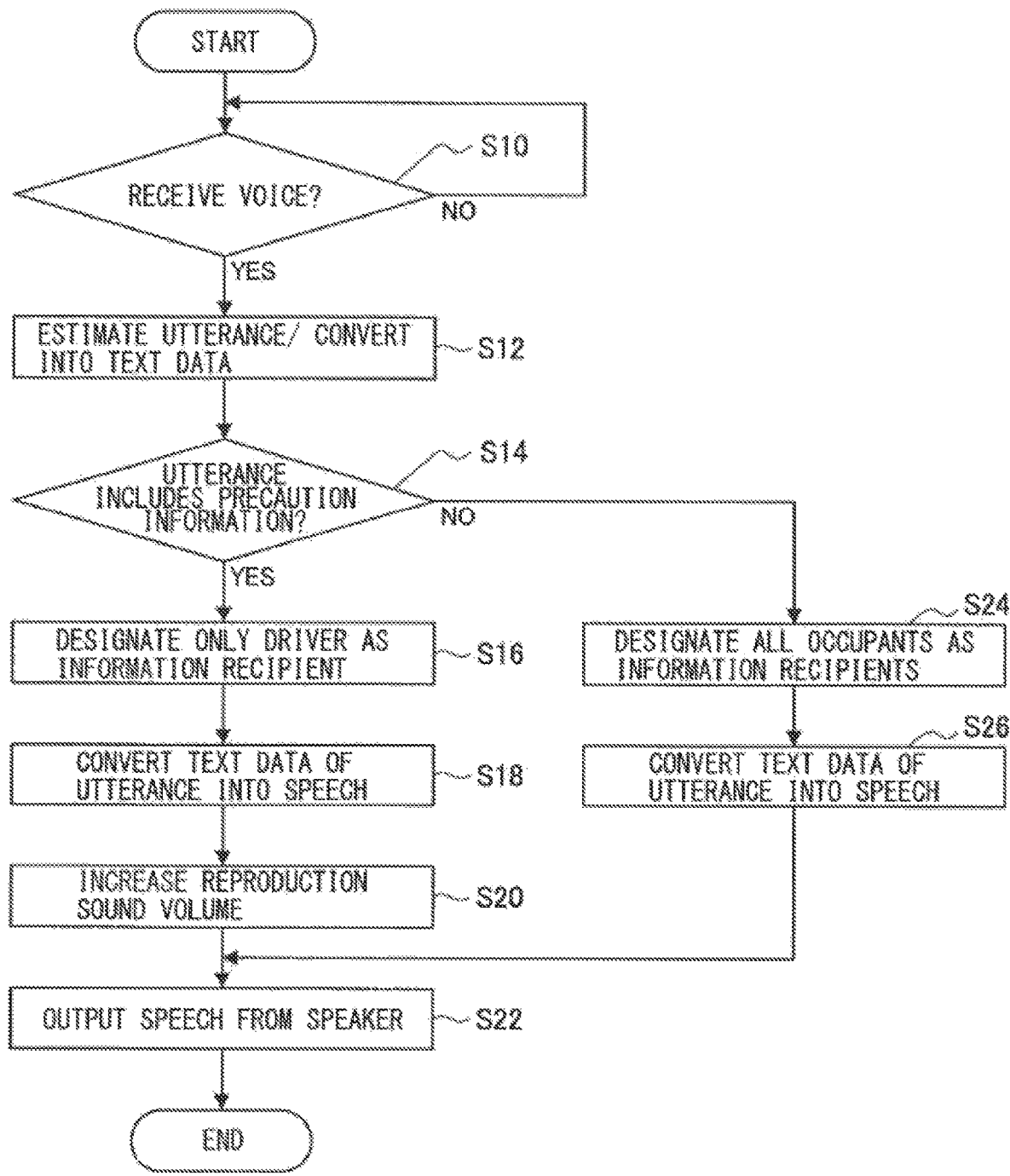
FIG. 3 is a flowchart illustrating an exemplary process executed by the attention calling apparatus for the vehicle according to one example embodiment of the technology.

In the process illustrated in FIG. 3, all of the occupants may be notified of speech information via the speakers when the text data of an utterance includes no precaution information in Step S14. Alternatively, the speech information may not be outputted from the speakers when the text data of an utterance includes no precaution information. In this case, a conversation may be exchanged as usual without using the speakers.

In at least one of the embodiments described above, precaution information included in a conversation between the occupants may be provided to the driver to call the driver's attention. In an alternative embodiment, the precaution information may be applied to control of the vehicle. For example, if a conversation includes precaution information such as "A car is coming from the right!", control for steering the vehicle to the left may be performed.

According to at least one of the embodiments described above, it is possible to call the driver's attention to precaution information included in a conversation between occupants. This facilitates appropriate driving of the vehicle in accordance with the precaution information.

One or more of the utterance estimating unit 400, the precaution information determining unit 500, and the output unit 800 in the attention calling apparatus 2000 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the utterance estimating unit 400, the precaution information determining unit 500, and the output unit 800. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the utterance estimating unit 400, the precaution information determining unit 500, and the output unit 800 in the attention calling apparatus 2000 illustrated in FIG. 2.

Although some example configurations and example processing according to the embodiments of the technology are described hereinabove, the foregoing embodiments are mere examples and are not intended to limit the scope of the technology. It should be also appreciated that various omissions, replacements, and modifications may be made in the foregoing embodiments described herein, without departing from the scope of the technology. The technology is intended to include such modifications and alterations in so far as they fall within the scope of the appended claims or the equivalents thereof.

The invention claimed is:

1. An attention calling apparatus for a vehicle, the apparatus comprising:
   a voice receiver configured to receive a voice from occupants in the vehicle;
   an utterance estimating unit configured to estimate an utterance on a basis of the voice;
   a precaution information determining unit configured to determine whether the utterance includes precaution information regarding driving of the vehicle;
   a notification unit configured to notify a driver of the vehicle of the precaution information when the utterance includes the precaution information; and
   an information recipient designating unit configured to designate at least one of the occupants as an information recipient to be notified of the precaution information, wherein
   the information recipient designating unit is configured to designate a driver of the vehicle out of the occupants as the information recipient when the utterance includes the precaution information, and
   the information recipient designating unit is configured to designate all of the occupants in the vehicle as the information recipient when the utterance does not include the precaution information.

2. The attention calling apparatus according to claim 1, wherein the notification unit is configured to output the utterance when the utterance includes the precaution information.

3. The attention calling apparatus according to claim 1, wherein the notification unit is configured to output the utterance with emphasis when the utterance includes the precaution information.

4. The attention calling apparatus according to claim 1, wherein
   the utterance estimating unit includes a text converter configured to convert the utterance estimated by the utterance estimating unit into text data,
   the notification unit includes a speech converter configured to covert the text data into speech, and
   the notification unit is configured to output the speech to a speaker.

5. The attention calling apparatus according to claim 2, wherein
   the utterance estimating unit includes a text converter configured to convert the utterance estimated by the utterance estimating unit into text data,
   the notification unit includes a speech converter configured to covert the text data into speech, and
   the notification unit is configured to output the speech to a speaker.

6. The attention calling apparatus according to claim 4, wherein the notification unit further includes a speech emphasizer configured to emphasize a sound volume of the speech when the utterance includes the precaution information.

7. The attention calling apparatus according to claim 5, wherein the notification unit further includes a speech emphasizer configured to emphasize a sound volume of the speech when the utterance includes the precaution information.

8. The attention calling apparatus according to claim 1, wherein
the utterance estimating unit includes a text converter configured to convert the utterance estimated by the utterance estimating unit into text data, and
the notification unit is configured to output the text data to a display.

9. The attention calling apparatus according to claim 2, wherein
the utterance estimating unit includes a text converter configured to convert the utterance estimated by the utterance estimating unit into text data, and
the notification unit is configured to output the text data to a display.

10. The attention calling apparatus according to claim 4, wherein
the notification unit further includes a text emphasizer configured to emphasize the text data when the utterance includes the precaution information.

11. The attention calling apparatus according to claim 8, wherein
the notification unit further includes a text emphasizer configured to emphasize the text data when the utterance includes the precaution information.

12. A method of calling attention to driving of a vehicle, the method comprising:
receiving, by a voice receiver of the vehicle, a voice from occupants in the vehicle;
estimating, by an utterance estimating unit of the vehicle, an utterance on a basis of the voice;
determining, by a precaution information determining unit of the vehicle, whether the utterance includes precaution information regarding the driving of the vehicle;
notifying, by a notification unit of the vehicle, a driver of the vehicle of the precaution information when the utterance includes the precaution information; and
designating, by an information recipient designating unit, at least one of the occupants as an information recipient to be notified of the precaution information, including:
designating, by the information recipient designating unit, a driver of the vehicle out of the occupants as the information recipient when the utterance includes the precaution information, and
designating, by the information recipient designating unit, all of the occupants in the vehicle as the information recipient when the utterance does not include the precaution information.

13. A non-transitory computer-readable recording medium containing a program, the program causing, when executed by a computer, the computer to implement a method, the method comprising:
receiving a voice from occupants in a vehicle;
estimating an utterance on a basis of the voice;
determining whether the utterance includes precaution information regarding driving of the vehicle;
notifying a driver of the vehicle of the precaution information when the utterance includes the precaution information; and
designating at least one of the occupants as an information recipient to be notified of the precaution information, including:
designating a driver of the vehicle out of the occupants as the information recipient when the utterance includes the precaution information, and
designating all of the occupants in the vehicle as the information recipient when the utterance does not include the precaution information.

14. An attention calling apparatus for a vehicle, the apparatus comprising:
a voice receiver configured to receive a voice from occupants in the vehicle; and
circuitry configured to
estimate an utterance on a basis of the voice,
determine whether the utterance includes precaution information regarding driving of the vehicle,
notify a driver of the vehicle of the precaution information when the utterance includes the precaution information, and
designate at least one of the occupants as an information recipient to be notified of the precaution information, including:
designate a driver of the vehicle out of the occupants as the information recipient when the utterance includes the precaution information, and
designate all of the occupants in the vehicle as the information recipient when the utterance does not include the precaution information.

\* \* \* \* \*